Dec. 13, 1949     S. H. ZEEB     2,491,406
COUPLING
Filed Dec. 6, 1945
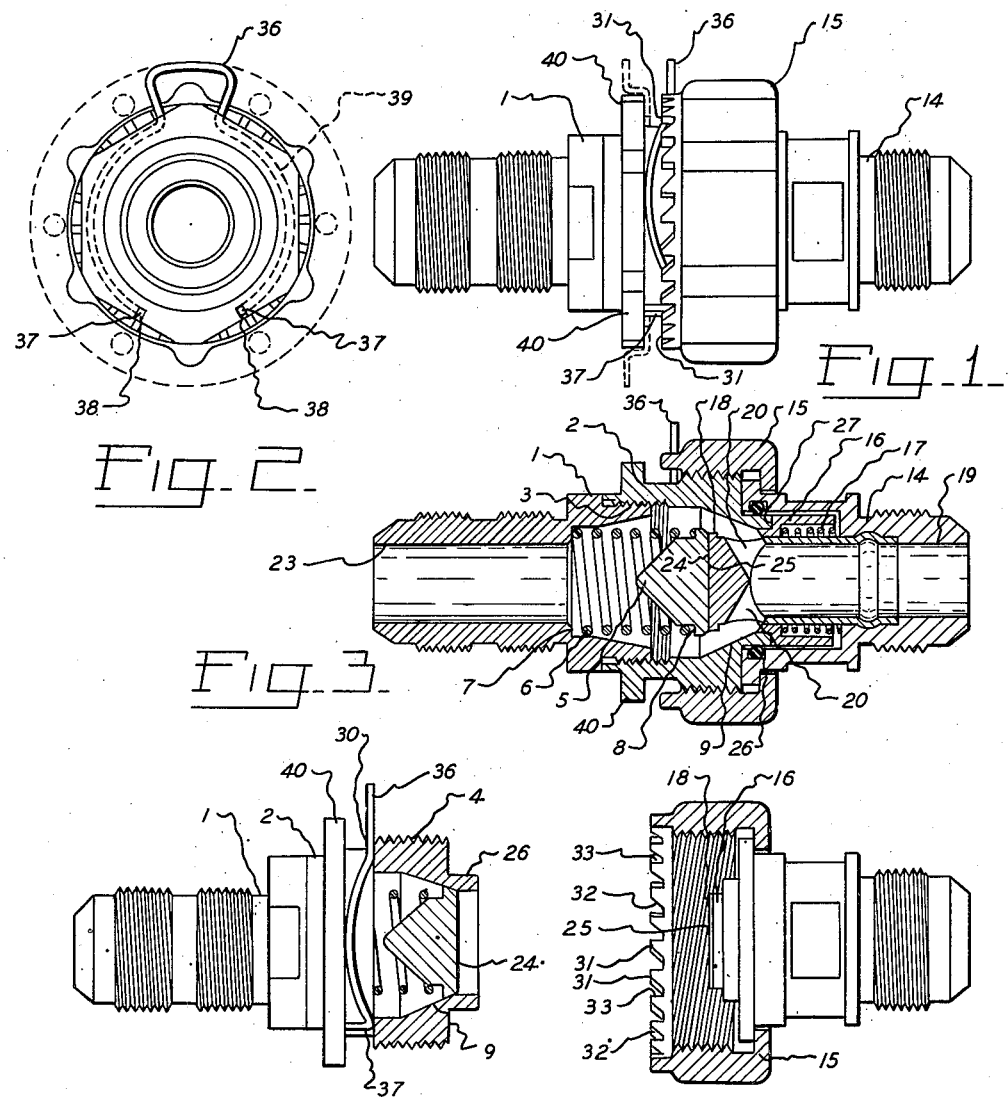
Inventor
STANLEY H. ZEEB
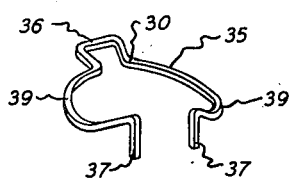
Attorneys Patented Dec. 13, 1949

2,491,406

UNITED STATES PATENT OFFICE 2,491,406

COUPLING

Stanley H. Zeeb, Jackson, Mich., assignor, by mesne assignments, to Aeroquip Corporation, Jackson, Mich., a corporation of Michigan Application December 6, 1945, Serial No. 633,191

2 Claims. (Cl. 285—120)

The present invention relates to a coupling for pipe, hoses or the like, and more particularly to a quick connecting and disconnecting coupling, having a lock.

In the art of coupling, quick connect and disconnect couplings are known, but have the disadvantage of requiring separate positive action in order to lock the same. The present invention provides a lock for couplings of the character described, and which automatically locks against uncoupling.

An object of the present invention is to provide a ratchet lock on a quick connecting and disconnecting coupling of the character described.

Another object of the invention is to provide a coupling nut on a quick connecting and disconnecting coupling, having ratcheting teeth for engaging with a spring latch to hold the portions of the coupling against uncoupling movements.

A still further object of the invention is to provide a unitary spring wire latch.

These and other objects residing in the combination, arrangement and construction of the parts will be apparent from the following specification, when taken with the accompanying drawing, in which Fig. 1 is a side elevational view of the invention, Fig. 2 is an end elevation of the structure of Fig. 1, Fig. 3 is a vertical section of the coupling of Fig. 1, showing the parts in coupled relation, Fig. 4 is a view corresponding to Fig. 3, showing the parts of the coupling in separated relation, and Fig. 5 is a perspective view of the spring wire latch, according to the present invention.

Referring particularly to the drawing, the male coupling member is provided with a body portion 1, which has a coupling portion 2 secured thereto by a threaded joint 3. The coupling portion 2 is provided with a male connector 4 having multiple threads thereon in parallel relation for quick coupling.

The connector 4 and coupling portion 2 have arranged therein a valve 5, supported on a helical spring 6. The spring 6 bears at one end on a shoulder 7 in the body 1 and at the other end on a shoulder 8 on the valve 5. The valve 5 engages with a valve seat 9 when the coupling is in separated relation, as shown in Fig. 4.

The body portion 14 of the coupling which is adapted to be coupled to the body portion 1 is provided with a female coupling nut 15, having internal multiple threads adapted to engage and threadably connect with the male connector 4, as shown particularly in Fig. 3. Arranged within the body 14 is a valve 16, normally extending outwardly under the action of the helical spring 17 into engagement with the valve seat 18, as shown particularly in Fig. 4. Fluid flows through the conduit 19 of the body portion 14 by passing through ports 20 in the valve seat 18. These ports are closed by the valve 16 when the same is in engagement with the valve seat 18. Likewise, fluid flow through the conduit 23 of the body portion 1 is prevented by the valve 5 bearing against the valve seat 9 when the coupling is open.

The coupling portions 1 and 14 are connected together by moving the same into engagement with each other so that the face 24 of the valve 5 bears against the face 25 of the valve seat 18. The face 25 forces the valve 5 inwardly against the action of the spring 6 to move the valve 5 from the seat 9 to open the conduit portion 3 of the body portion 1 to the flow of fluids. At the same time, the annular boss 26 on the connector 4 engages with shoulder 27 of the valve 16 to urge the same against the action of the helical spring 17, to move the valve 16 from the seat 18 to open the conduit portion 19 of the body portion 14 to the flow of fluids. This joint action results in a flow of fluids through the entire coupling. At the same time as the connection is made as hereinabove described, it will be understood that the coupling nut 15 is threaded onto the connector 4, the action of the coupling nut 15, moving along the connector 4, drawing the face 25 against the face 24.

Retrograde movement of the coupling nut 15 is prevented by the use of a spring wire latch 30 and ratchet teeth 31 extending axially from the open end of the coupling nut 15. Each of the teeth 31 is provided with a camming face 32 and a latching face 33.

The spring wire latch 30 is shown particularly in Figs. 4 and 5 and consists of an integral piece of wire, having a body portion 35, generally circular in configuration from one end of which projects an integral loop 36. At the other end of the latch 30 opposite the loop 36, the ends of the wire are formed into laterally extending prongs 37. The prongs 37 are disposed in holes 38 in the coupling portion 2, particularly as disclosed in Fig. 2, for the purpose of anchoring the latch firmly with respect to the coupling portion 2. The mid-portion of the latch 30 between the loop 36 and the prongs 37 is bowed laterally to provide arcuate portions 39, shown particularly in Figs. 1, 4 and 5. The arcuate portions 39 bear against the portion 40 of the coupling portion 2 as shown particularly in Figs. 1 and 4, urging the loop 36 of the latch 30 toward the threaded connector 4. As the coupling nut 15 is rotated to couple the body portions 1 and 14 together, the camming faces 32 of the ratchet teeth 31 cam past the loop 36 permitting the arms of the loop 36 to fall behind the catching faces 33 each time a camming face 32 is passed, until the coupling nut 15 is completely taken up on the connector 4. At this point, the arms of the loop 36 will be between teeth 31 and one or both of the arms of the loop 36 will be bearing against a catching face 33 to prevent uncoupling movement of the coupling nut 15.

With the parts in the locked relation described, it will be impossible for the coupling to become uncoupled due to vibration or other accidental means. However, upon the mere moving of the loop 36 of the latch 30 to the left as viewed in Fig. 4, the arms of the loop 36 are moved from behind the catching faces 33 of the teeth 31 with the result that the coupling nut may be rotated in an uncoupling direction to separate the body portions 1 and 14 of the coupling.

The invention as described discloses a particular form of self-sealing structure for preventing the flow of fluids through the coupling when the same is open. It will be understood that a self-sealing coupling structure of other characteristics or no self-sealing structure at all may be employed, as the invention resides solely in the structure for locking the quick connecting and disconnecting coupling against uncoupling. Furthermore, it is contemplated that changes in details may be made such as would occur to one skilled in the art. Accordingly, I do not wish to be limited except by the scope of the following claims.

Having thus described my invention, what I desire to secure by Letters Patent and claim is:

1. A coupling of the character described, comprising two body portions, a fixed coupling means on one of said body portions, a coupling nut on the other of said body portions, said coupling nut being rotatable relatively to said fixed coupling means to effect a coupling of said body portions, a spring latch anchored to the body portion having said fixed coupling means and resiliently biassed towards the other said coupling means, the said spring latch being in the form of an open loop of spring wire having its terminal ends anchored to the said fixed coupling means and having the looped portion thereof opposite its said terminal ends formed to extend radially outwards beyond said coupling nut, a plurality of axially extending teeth mounted along the edge of said coupling nut normally facing the fixed coupling means, said teeth having camming faces and catching faces, said camming faces being arranged for successive operative engagement with said spring latch, whereby said teeth cam by said loop during relative coupling movement of said coupling nut with respect to said fixed coupling means, and the catching faces of said teeth engage said spring latch to prevent relative uncoupling movement of said coupling means, the said outwardly directive portion of the said loop being always accessible for manual actuation to stress the spring latch against its own spring action and thereby free the coupling means for uncoupling movement.

2. A spring latch of the character described, comprising a body portion in the form of a piece of wire arranged in the form of an open loop of generally circular configuration and having an integral ear portion extending radially outwards from the loop at a point substantially diametrically opposite its terminal ends and mounting means for said terminal ends of the said loop, the portions of the latter between the said ear and the terminal ends being bowed in a plane corresponding to the direction of the flexing movement of the latch.

STANLEY H. ZEEB.

REFERENCES CITED

The following references are of record in the file of this patent:

UNITED STATES PATENTS

| Number | Name | Date |
|---|---|---|
| 629,995 | Hemphill | Aug. 1, 1899 |
| 1,615,595 | Connor | Jan. 25, 1927 |
| 2,051,899 | Rose | Aug. 25, 1936 |

FOREIGN PATENTS

| Number | Country | Date |
|---|---|---|
| 191,817 | Great Britain | Jan. 17, 1923 |